United States Patent
Daugherty

[19]

[11] Patent Number: 6,032,963
[45] Date of Patent: Mar. 7, 2000

[54] PORTABLE WATER CONTAINER

[76] Inventor: Michael L. Daugherty, Loring St., Stonewall, Tex. 78671

[21] Appl. No.: 09/028,770
[22] Filed: Feb. 24, 1998
[51] Int. Cl.⁷ .................................................. B62B 1/00
[52] U.S. Cl. ................................ 280/47.26; 280/47.17
[58] Field of Search ........................ 280/47.17, 47.18, 280/47.24, 47.26, 47.315, 47.34, 47.35, 47.21, 641; 224/402, 403, 404, 926; 220/562, 568, 759, 761

[56] References Cited

U.S. PATENT DOCUMENTS

| | | | |
|---|---|---|---|
| 2,703,607 | 3/1955 | Simmonds | 158/46 |
| 3,727,971 | 4/1973 | Sisler . | |
| 4,089,446 | 5/1978 | Logan, II et al. . | |
| 4,153,011 | 5/1979 | Weissman et al. . | |
| 4,633,815 | 1/1987 | Peterson et al. . | |
| 4,873,841 | 10/1989 | Bradshaw et al. | 62/239 |
| 4,886,176 | 12/1989 | Steakley | 215/229 |
| 5,098,019 | 3/1992 | Landefeld . | |
| 5,323,833 | 6/1994 | Kirkmyer . | |
| 5,370,409 | 12/1994 | Latouche | 280/47.26 |
| 5,381,567 | 1/1995 | Tanner et al. . | |
| 5,407,218 | 4/1995 | Jackson | 280/30 |
| 5,683,097 | 11/1997 | Fenton et al. | 280/655.1 |
| 5,899,544 | 5/1999 | James et al. | 224/404 |
| 5,924,615 | 7/1999 | McGarrah | 224/404 |

*Primary Examiner*—Lanna Mai
*Assistant Examiner*—Kevin McKinley
*Attorney, Agent, or Firm*—Jacobson, Price, Holman & Stern, PLLC

[57] ABSTRACT

A rectangular shaped container which is fittable in the bed of a pick-up truck behind the cab or at the rear of the bed, near the tailgate. The container is made of high strength industrial plastic and can accommodate 40 gallons of water in one embodiment and 60 gallons of water in another embodiment. The container can be equipped with a hand pump or an electric pump, operable from a twelve volt direct current electric source such as the battery of a pick-up truck, for removal of water from the container. The container includes a bracket for fitting onto the end rail of the bed of the pick-up truck behind the cab. If a tool box is mounted behind the cab of the truck, the bracket is fittable onto the tailgate for securing the container at the opposite end of the bed of the pick-up truck.

20 Claims, 2 Drawing Sheets

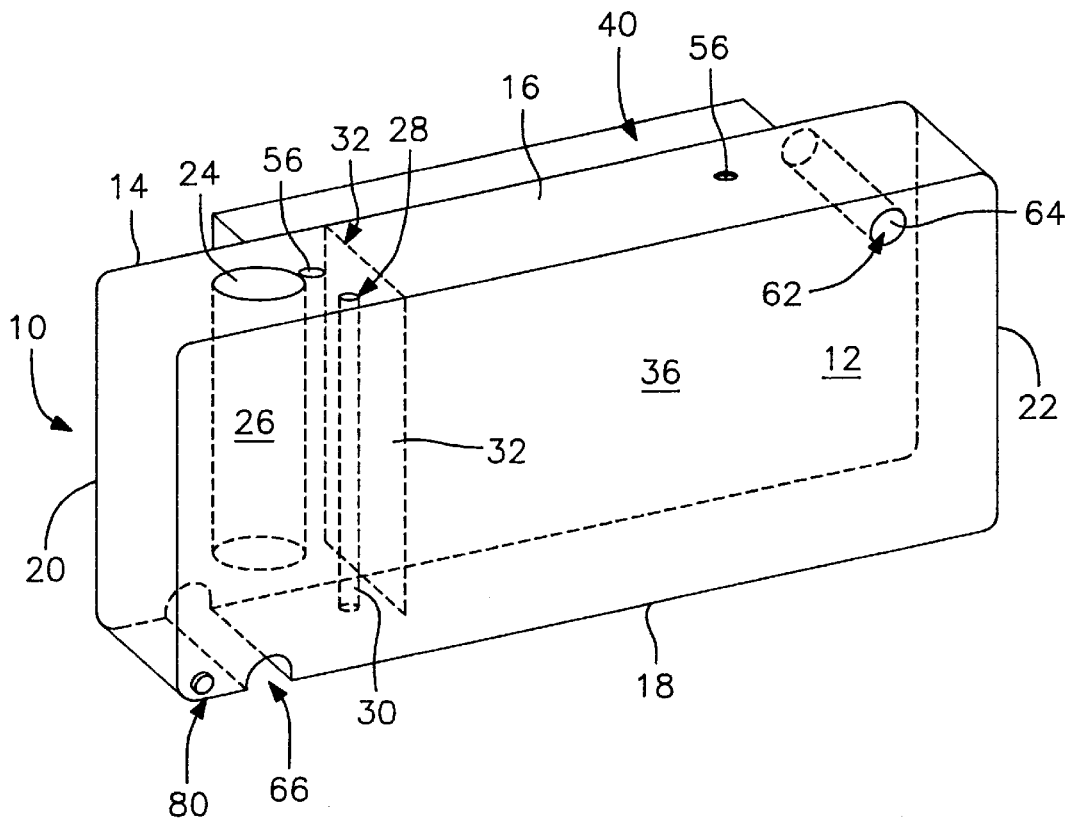
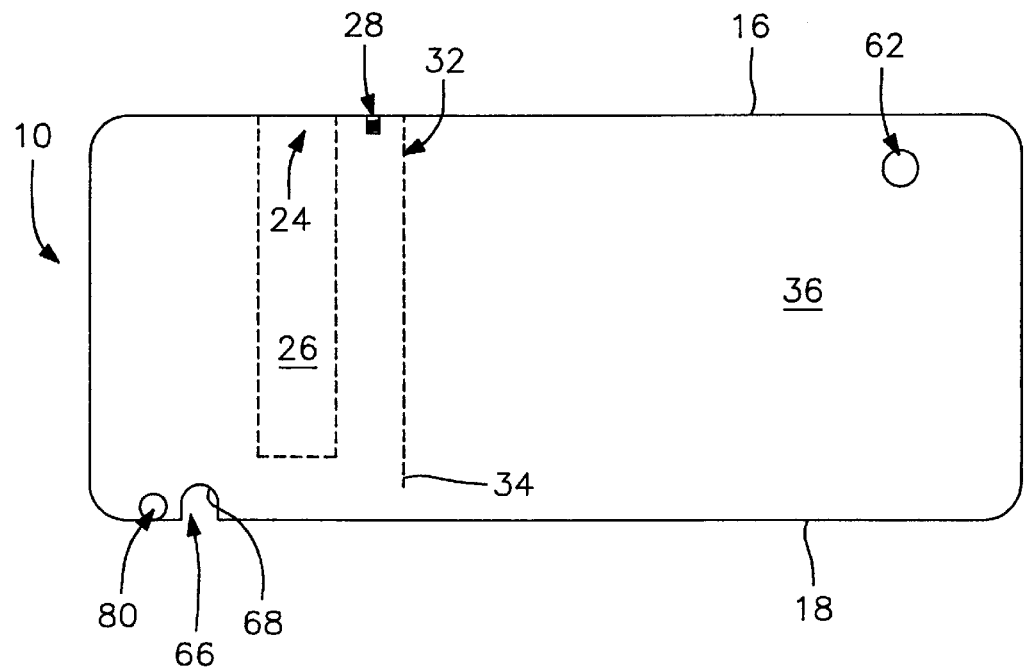

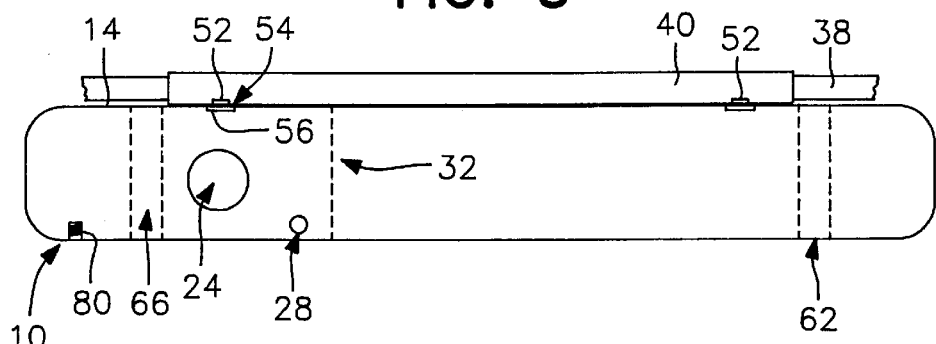
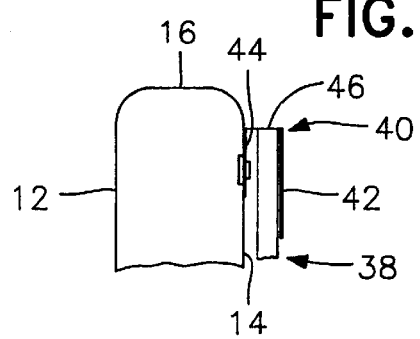
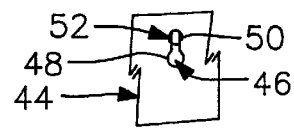
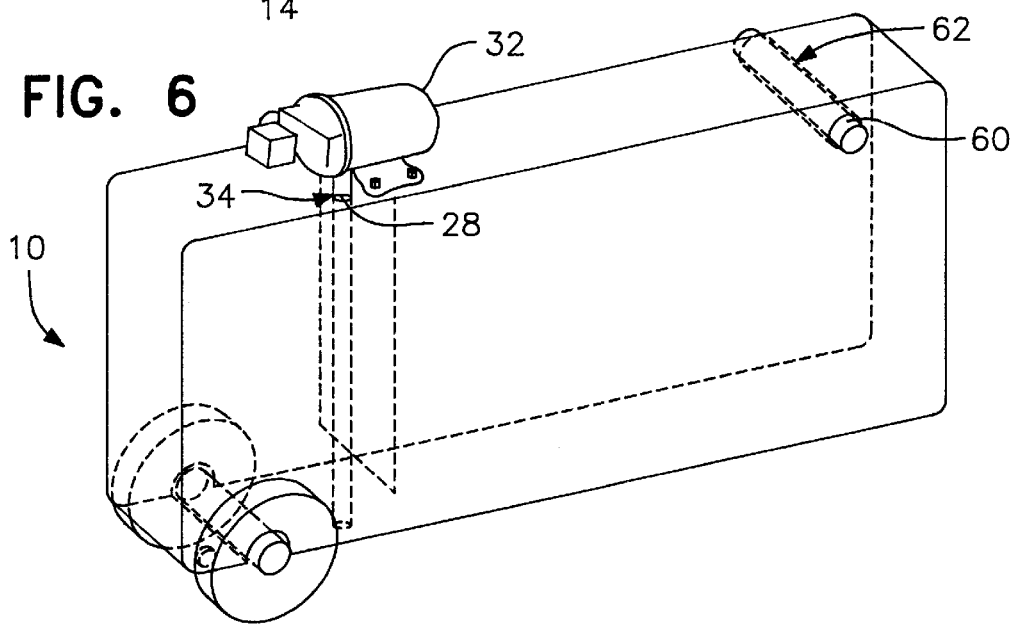
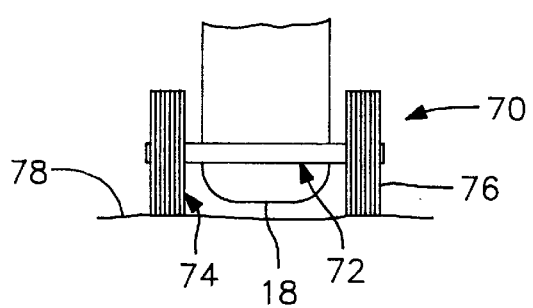
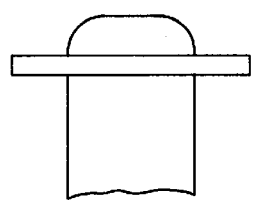

PORTABLE WATER CONTAINER

FIELD OF THE INVENTION

The present invention relates to a water container to be held in the cargo area or bed of a pick-up truck for transporting water to an area where water may not be readily available. This water container is for use by cattlemen, rodeo performers, live stock haulers, stock show exhibitors, recreational vehicle users, sportsmen, 4-H club members, hikers and others.

BACKGROUND OF THE INVENTION

Oftentimes, when traveling great distances, in on or off road conditions, or across farmlands, for example, sources of water are few and far between. To provide water to remote locations, it has often been necessary to tow a water container or place loose containers of water in the back or storage area of a pick-up truck. The use of a towed water container, limits the capability of a pick-up truck to reach certain remote areas over rough terrain. In addition, loosely stored water bottles may become damaged or actually thrown from the storage area of a pick-up truck during travel over rough terrain.

In addition, upon reaching a remote location, it may be necessary to further transport large quantities of water along a path which is too narrow for passage by a pick-up truck.

SUMMARY OF THE INVENTION

Accordingly, it is an object of the present invention to provide a multi-use portable container for potable water or other liquids, such as gasoline.

This object is accomplished by providing a rectangular shaped container which is fittable in the bed of a pick-up truck behind the cab or at the rear of the bed, near the tailgate. The container is made of high strength industrial plastic and can accommodate 40 gallons of water in one embodiment and 60 gallons of water in another embodiment.

The container can be equipped with a hand pump or an electric pump, operable from a twelve volt direct current electric source such as the battery of a pick-up truck, for removal of water from the container.

The container includes a bracket for fitting onto the side rail of the bed of the pick-up truck behind the cab. If a tool box is mounted behind the cab of the truck, the bracket is fittable onto the tailgate for securing the container at the opposite end of the bed of the pick-up truck.

The bracket engages with two spaced tabs extending from a rear surface of the container. The bracket includes two corresponding slotted openings for receipt of the tabs. The bracket thereby locks the container in place in the bed of the truck.

The container is removable from the bed of the pick-up truck and includes a through passage for receipt of a rod handle and a groove for receipt of an axle. The axle includes two wheels.

The axle of the wheels fits into the groove in the container so as to lift the bottom of the container above the ground level. This places the weight of the container on the wheels located at the opposite ends of the axle.

The rod handle extends through the passageway in the container and beyond both sides of the container. The handle is used to lift the container at a diagonally opposite corner from the axle and wheels so as to transport the container, with the weight of the container resting on the wheels of the axle.

An internal stiffening plate maintains the separation of the sidewalls and, under certain temperature conditions, also provides an ice barrier. The stiffening plate limits pieces of ice from blocking the outlet openings of the container.

Water is removable from the container by a pump extending through one of two openings in the upper surface of the container. Alternatively, water is removed from a drain hose fitting located adjacent a bottom surface of the container.

Accordingly, it is an object of the present invention to provide a portable container for potable water which is removably mounted behind the cab of a pick-up truck or on the tailgate of a pick-up truck.

It is another object of the present invention to provide a water container which is removably mounted in the bed of a pick-up truck and includes openings for receipt of an axle located between two wheels and a handle so as to lift and transport the container by the axle and wheels removably fitted into the opening in the container.

It is another object of the present invention to removably mount a water container in the bed of a pick-up truck by a bracket which is removably mounted on a rear wall of the bed of the pick-up truck, behind the cab of the pick-up truck, or on the tailgate of the bed of the pick-up truck.

It is still yet another object of the present invention to provide a water container from which water may be removed by a hand pump or an electric demand pump, powered by the battery of the pick-up truck into which the water container is removably mounted.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 1 is a perspective view of the water container of the present invention.

FIG. 2 is a side elevational view of the water container.

FIG. 3 is a top plan view of the water container, including the bracket stabilizer removably mounted on the water container and removably mounted on a wall of the bed of a pick-up truck.

FIG. 4 is a side view of the water container with the bracket stabilizer mounted on the wall of a bed of the pick-up truck.

FIG. 5 illustrates the interengagement of a tab, mounted on the rear of the container, in a slot in the bracket stabilizer.

FIG. 6 is a perspective view of the water container of the present invention and including a demand pump mounted on the top surface of the container, a handle passing through a passageway to in the container and an axle resting in a U-shaped slot of the container with the axle including two wheels to elevate the container above the ground and provide the ability for the container to be moved to various locations.

FIG. 7 illustrates the position of the axle in the U-shaped slot in the bottom surface of the container.

FIG. 8 illustrates the passing of the handle through a passageway in the container for lifting of the container.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1 through 3, in particular, a liquid storage container embodying the teachings of the subject invention is generally designated as 10. With reference to its orientation in FIG. 1, the liquid storage container 10 includes two parallel side wall surfaces 12 and 14, an upper surface 16, a bottom surface 18, and two end surfaces 20, 22. These surfaces define a liquid tight container.

In the upper surface 16, is located an opening 24 of a cylindrical passageway 26 extending into the interior of the container 10. The opening 24 can be used to fill the container with water.

In addition, a hand pump having a water pick-up tube can be mounted in opening 24 with the water pick-up tube extending through cylindrical passageway 26 to be positioned adjacent to the lower surface 18 for removing the water from the container. Actuation of the hand pump will lift water out of the container and direct the flow of water to a desired location.

Alternatively, a ⅜ inch pipe fitting 28 extends through the upper surface 16 of the container 10 and is connected to a pick-up pipe 30. As shown in FIG. 6, a direct current demand pump 32 can be connected by pipe 34 to the pipe fitting 28 for evacuation of water from the interior of the container 10. Pump 32 is a 12 volt direct current pump which is powered by the battery of the pick-up truck into which the container 10 of the present invention is mounted.

Located between the sidewalls 12 and 14, extending perpendicular to the sidewalls and extending from the upper surface 16 to a position spaced from the lower surface 18, is a stiffener plate or ice baffle 32. End 34 of the plate 32 is positioned above lower surface 18 so that in the event ice is formed in the water, near the top of compartment 36 of the container 10, and the water level is lowered by the removal of water from the container, the ice will be blocked from passing under end 34 of the plate 32. This will prevent potential blockage of the removal of water from cylindrical passageway 26 or from pipe 30 (which has been omitted from FIG. 2).

The container 10 is mounted on the wall of the bed of a pick-up truck, located behind the cab, or alternatively, mounted on the tailgate of the bed of the pick-up truck. For illustrative purposes, a wall 38 representative of a wall located behind the cab of the pick-up truck has been shown in FIGS. 3 and 4. It is understood as being within the scope of the present invention that wall 38 may be representative of the tailgate of the pick-up truck.

The container 10 is mounted on wall 38 by e. J-shaped or U-shaped bracket stabilizer 40. As shown in FIG. 4, the bracket stabilizer includes a leg portion 42 and a parallel, but shorter leg portion 44. The leg portions 42, 44 are interconnected by a cross piece 46. The separation of the leg portions 42 and 44 is sufficient to surround wall 38 or the tailgate of a pick-up truck.

The leg portion 44 include two slots 46 each having a circular opening 48 at the bottom of a parallel walled groove 50.

Two circular button tabs 52 extending from the rear wall 14 of the container are each passed through the respective circular opening 48 of the slots 46. A narrowed width portion 54 interconnects the tab 52 and a reinforcing plate 56 secured to the rear wall 14 of the container 10.

Two slots 46 are formed in the leg portion 44 of the bracket stabilizer 40 for interengagement with two tabs 52 spaced across the rear wall 14 of the container as shown in FIG. 3. The dimensioning of the slots 46 is such that when the bottom wall 18 of the container is positioned on the bed of the pick-up truck, the narrowed width portion 54 connecting the tab 52 with the plate 56, is positioned between the parallel edges of groove 50. Therefore, with the bracket stabilizer 40 positioned around wall 38 or the tailgate of the bed of the pick-up truck, the tabs 52 will secure the container 10 in place in the bed of the pick-up truck.

Upon arrival of the truck at a predetermined destination, the container of the present invention is removable from the bed of the pick-up truck and transportable to another location. To facilitate the movement of the container, the container and the bracket stabilizer are lifted from engagement with the wall 38 or the tailgate of the bed of the pick-up truck. The bracket stabilizer can then be removed from the container.

After removal of the container from the bed of the truck, a tow handle 60 is inserted through a passageway 62 having a cylindrical wall 64. Opposite ends of the tow handle project from the passageway 62. The handle is used to lift one end of the container.

At the opposite end and at a diagonally opposite corner of the container, a U-shaped groove 66 having a U-shaped wall 68 is dimensioned to receive an axle assembly 70. The axle assembly includes a central axle 72 with two wheels 74, 76 positioned at opposite ends of the axle. When the container is lifted and rested on the axle assembly with the axle positioned in the U-shaped groove 66, the wheels 74, 76 will elevate the lower surface 18 of the container above the ground 78. By lifting up on tow handle 60, the container may then be wheeled to a different location.

It is understood that for replacement of the container in the bed of a pick-up truck, the axle assembly 70 and tow handle 60 are removed from their respective groove and passageway in the container. If an undirected emptying of the water from the container is desired, a hose can be connected to drain fitting 80 located adjacent to the lower surface 18 of the container. The empty container may be reconnected with the bracket stabilizer to maintain the position of the container on one of the end walls of the truck during travel.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A container for transporting a liquid in a bed of a pick-up truck, said container comprising:

two spaced side walls interconnected by an upper wall, a lower wall and two opposed end walls to form a liquid-tight container, said upper wall including an opening for removal of liquid by a pump mounted on said upper wall, and a slot in said lower wall for removably receiving an axle assembly, said axle assembly including two wheels and an axle for elevating said lower wall and facilitating transporting of the container, said axle assembly being placed in said slot when the container is removed from the bed of the pick-up truck, and said axle assembly being removed from said slot when the container is placed in the bed of the sick-up truck.

2. A container for transporting a liquid as claimed in claim 1, wherein a passageway extends between an opening in each of said side walls to define an opening for a handle to be inserted through the container.

3. A container for transporting a liquid as claimed in claim 1, wherein a stiffening plate extends between said two side walls.

4. A container for transporting a liquid as claimed in claim 3, wherein said stiffening plate extends from said upper wall and terminates short of said lower wall.

5. A container for transporting a liquid as claimed in claim 1, wherein two spaced projections extend from said rear wall for cooperation with openings in a bracket stabilizer to secure the container in a bed of a truck.

6. A container for transporting a liquid as claimed in claim 5, wherein said bracket stabilizer is J-shaped for receiving one of a wall and a tailgate of a bed of a truck.

7. A container for transporting a liquid as claimed in claim 5, wherein said two projections each include a button tab interconnected to said rear wall by a stem having a width less than a diameter of said button tabs.

8. A container for transporting a liquid as claimed in claim 5, wherein said bracket stabilizer includes two arm portions and an interconnecting crosspiece, one of said two arm portions being longer than the other of said two arm portions, said other arm portion including said openings.

9. A container for transporting a liquid as claimed in claim 1, wherein said two wheels of said axle assembly have a diameter such as to elevate said lower wall above the ground when said axle is positioned in said slot.

10. A container for transporting a liquid in a bed of a pick-up truck, said container comprising:

two spaced side walls interconnected by an upper wall, a lower wall and two opposed end walls to form a liquid-tight container, a slot in said lower wall for removably receiving an axle assembly, said axle assembly including two wheels and an axle for elevating said lower wall and facilitating transporting of the container, said axle assembly being placed in said slot when the container is removed from the bed of the pick-up truck, and said axle assembly being removed from said slot when the container is placed in the bed of the pick-up truck, and a bracket stabilizer for securing the container to a wall of the bed of the truck, said rear wall and said bracket stabilizer including cooperating parts to removably mount the container to the wall of the bed of the truck.

11. A container for transporting a liquid as claimed in claim 10, wherein a passageway extends between an opening in each of said side walls to define an opening for a handle to be inserted through the container.

12. A container for transporting a liquid as claimed in claim 10, wherein a stiffening plate extends between said two side walls.

13. A container for transporting a liquid as claimed in claim 12, wherein said stiffening plate extends from said upper wall and terminates short of said lower wall.

14. A container for transporting a liquid as claimed in claim 10, wherein said cooperating parts include openings in said bracket stabilizer and projections extending from said rear wall.

15. A container for transporting a liquid as claimed in claim 14, wherein said bracket stabilizer is U-shaped for receiving the wall of the bed of the truck between two arm portions of the stabilizer bracket.

16. A container for transporting a liquid as claimed in claim 15, wherein one of said two arm portions includes said openings.

17. A container for transporting a liquid as claimed in claim 10, wherein a radius of said two wheels is greater than a distance between a longitudinal axis of said axle and the lower wall of the container.

18. A container for transporting a liquid as claimed in claim 11, wherein the handle is slidably mounted in said passageway.

19. A container for transporting a liquid as claimed in claim 10, wherein said slot is U-shaped and opens towards said lower wall.

20. A container for transporting a liquid, said container comprising:

two spaced side walls interconnected by an upper wall, a lower wall and two opposed end walls to form a liquid-tight container, said upper wall including an opening for removal of liquid by a pump mounted on said upper wall, and a stiffening plate extending from one of said two side walls to the other of said two side wall, said stiffening plate terminating short of said lower wall for blocking pieces of ice from migrating towards said opening and interfering with removal of water from said opening.

* * * * *